United States Patent Office 3,006,763
Patented Oct. 31, 1961

3,006,763
METHOD OF PRODUCING A DRY SUGAR-COCOA MIX
Willard Marcy, Philadelphia, and Raymond Netsch, Line Lexington, Pa., assignors to The American Sugar Refining Company, New York, N.Y., a corporation of New Jersey
No Drawing. Filed June 3, 1954, Ser. No. 434,328
8 Claims. (Cl. 99—26)

This invention relates to an improved sugar-cocoa mix which is readily miscible with and dispersible in cold liquids such as milk, as well as in hot liquids, to produce a chocolate drink; and the invention includes the new sugar-cocoa mix and the method of producing it.

The cocoa powder of commerce is substantially insoluble in cold aqueous media such as water or milk. Furthermore, because of its low density and hydrophobic or water repellent character, cocoa powder is not readily wetted, tending to float on the surface of the liquid in clumps of dry aggregates. Even vigorous mechanical mixing will not disperse these clumps throughout the body of the liquid. The hydrophobic character of cocoa is not modified to a great extent when the cocoa is simply mixed mechanically with sugar; and the resulting mix is not readily dispersed when stirred into a cold liquid, the sugar dissolving and the cocoa floating on the surface in clumps.

In hot liquids, such as hot water or hot milk, the hydrophobic character of cocoa is modified by heat so that a dispersion is more readily made with moderate agitation. And for hot drinks a simple mechanical mixture of sugar, cocoa and other bodying and flavoring ingredients can be used without special treatment; but this method is unsatisfactory with cold liquids.

It has been proposed to make sugar-cocoa mixes containing sugar, cocoa and emulsifier intimately bound together so that the hydrophobic character of the cocoa is neutralized and so that the product consists of particles having a relatively uniform size which do not separate or stratify when handled during packing and shipping. But the preparation of such products generally requires special equipment or extensive processing, or the utilizing of special grades of the various ingredients, or may be difficult to vary or control to yield products having the desired properties.

The present invention provides an improved sugar-cocoa mix in dry form which is readily miscible with and dispersible in cold liquids such as cold milk, as well as in hot liquids, to produce a chocolate drink, and which is also suitable for preparing chocolate flavored candies, such as fudge, cake icings and other products in a minimum amount of time. The improved product is moreover one which is readily prepared in conventional low cost equipment from commercially available ingredients without having to resort to complicated or costly methods of processing.

The improved sugar-cocoa product of the present invention has the advantage of easy dispersibility, uniformity of particle composition and size and with a flexibility of product, due to the wide range in proportions and types of sugar, cocoa and aqueous spray which may be used, such that mixes of varying wetting out and dispersion rates, bulk densities, and shades of colors can be readily produced.

The improved process of the present invention for producing the sugar-cocoa mix requires no special expensive equipment and a minimum of processing and enables commercially available grades or types of ingredients to be used. An improved cocoa mix can thus be made easily and economically, which is a valuable product for use in making both cold and hot drinks, as well as for the production of chocolate flavored candies, cake icings, and other food uses where cocoa and sugar are desirable ingredients.

In the improved method of the present invention, the sugar-cocoa mixture is produced in a form in which the sugar and cocoa particles and flavoring materials are cemented together with solid sugar deposited from solution in contact with the individual particles and acting as a binder to cement sugar and cocoa particles to other sugar and cocoa particles and to each other. This improved method increases the effective weight of the cocoa particles and enhances their dispersibility. When the improved composite particles produced by this process are introduced into a liquid, the sugar component of the particles dissolves and the attached cocoa particles wet out before they can coalesce into a non-wettable unit. The composite particles can be distributed evenly throughout the volume of the liquid by simple moderate stirring, so that the attached cocoa particles can also be dispersed quickly and evenly throughout the liquid.

In carrying out the process and producing the improved sugar-cocoa mix, in which the sugar and cocoa particles etc., are cemented together to form small aggregates by the action of solid sugar deposited from an aqueous solution in contact with the various solid particles, the dry sugar-cocoa mix is treated with a small and regulated amount of an aqueous liquid, particularly water or a sugar solution, introduced in the form of finely divided liquid particles which are uniformly distributed through the dry mix. When water is used, the individual small particles which comprise the liquid spray will dissolve a small amount of the sugar to form a sugar solution. The admixing of the fine spray droplets of aqueous liquid with the dry ingredients results in the production of small aggregates of sugar and cocoa particles. On drying to remove the water, the sugar which is deposited from the solution acts as a binder to cement together sugar and cocoa particles to other sugar and cocoa particles and to each other.

A limited and regulated amount of the finely divided liquid is applied and distributed throughout the dry sugar-cocoa mix so that the aggregates formed are small aggregates and so that the formation of large aggregates is avoided or minimized. In general, the amount of aqueous liquid added, which serves to wet and form small aggregates of the sugar and cocoa particles, will be a small percentage of the weight of the dry sugar-cocoa mix, varying somewhat with the relative proportions of and the particle size of the dry ingredients of the mix and with the concentration and spraying characteristics of the aqueous liquid. In general, the amount of water introduced as water spray, or wet steam spray or as an aqueous solution spray will be between about 2% and 9% of the dry ingredients to which the liquid is added. The amount will vary somewhat with the fineness of subdivision of the liquid used. The amount of such added liquid is limited so that the mixture remains freely flowing thus avoiding caking or sticking of the mass in the processing equipment.

The liquid used to form the cementum for the sugar and cocoa particles is advantageously a sugar solution such as a solution of invert sugar, sucrose, dextrose or other commercially available forms of sugars. And sugar solutions containing a substantial percentage of sugar can advantageously be used, e.g., sugar solutions containing 25% or 50% of invert sugar or sucrose.

The aqueous liquid added to the dry mix, when added in the form of a sugar solution, or as water which forms a sugar solution in the mix, should be added in a finely sub-divided form for most efficient use in forming aggregates in the mix. This fine state of subdivision can be obtained in various ways, for example, by reducing the aqueous liquid to a fine spray by atomizing it using compressed air, as through the use of a spray gun or other device capable of forming a fine mist or spray.

An advantageous method of adding water in finely divided form to the dry mix is by injecting a stream of wet steam at essentially atmospheric pressure into the dry mixture of sugar, cocoa, flavoring and other desirable solid ingredients in a mixing machine, or other suitable apparatus, and with mixing and agitation of the mixture. The wet steam condenses upon contact with the cooler surface of the mix to produce extremely fine particles of water and these act by dissolving sugar, which is subsequently recrystallized on drying to cause an ultimate cementing, or binding together of the particles. When the aqueous liquid is introduced in this way, it gives a much more finely dispersed state than when e.g., an air spray gun is used to introduce the aqueous spray. The use of wet steam also raises the temperature of the mix somewhat and keeps the amount of oversized product (on 35 mesh screen) at a minimum due to a more efficient use of the water introduced into the mix in this way. Also, the use of wet steam gives a product which after drying enables less emulsifying agent (lecithin) to be used to achieve the same degree of wetting out and dispersibility than when the water is introduced by the pressure spray method.

In carrying out the process and producing the sugar-cocoa mix a dry mixture of sugar, cocoa, flavor and other desirable solid ingredients is placed in a mixing machine or other suitable apparatus. Into this mixture there is injected and mixed a small and regulated amount of finely divided liquid, such as sugar solution, in the form of a fine mist, or spray, or water in the form of a fine mist or spray, or in the form of wet steam. The aqueous liquid can be applied as a spray at ordinary temperatures, but is better used at somewhat elevated temperatures if the concentration of sucrose or other sugar solids is high.

The amount of the aqueous liquid incorporated into the mix will vary somewhat with the fineness of subdivision of the liquid particles and should be sufficient to convert all or nearly all the particles of sugar, cocoa, etc., of the dry mix into small aggregates by cementing together the sugar and cocoa particles to the necessary extent, yet avoiding caking and sticking together of the mass in the processing equipment and allowing the mass to retain a relatively dry feel. The maintenance of this desirable physical condition during processing imposes an upper limit on the amount of aqueous liquid that may be used.

When water is used to bring about the desired aggregation of sugar and cocoa particles, a result is obtained similar to that occurring when a sugar solution is used. The similarity of results when water is used instead of sugar solution is due to the dissolution of some sugar from the sugar particles in contact with the water introduced to form sugar solution which acts as cementum to bind together the particles constituting the aggregate. Upon drying the individual particles are held together by the sugar which crystallizes or is deposited from the cementum. Thus sugar solution may be used directly to bring about the desired aggregation or the sugar solution may be formed "in situ" by using water. In both cases, the liquid is introduced in a state of fine subdivision and is uniformly distributed throughout the dry mix to form small aggregates. Some of the fine sugar and cocoa particles are completely wetted by the liquid used and some appear to be affixed to the surface of the small particles of liquid and of the aggregates formed therewith.

The spraying of the mixture of sugar and cocoa with the finely divided liquid, or the treatment with wet steam, is advantageously carried out while the mixing is in progress. A variation of this procedure is to add the cocoa and the liquid spray either simultaneously or alternately to the sugar while the mixing is in progress. The effect of adding the finely divided liquid is to cause sticking together of the sugar and cocoa particles so as to cover over the sticky liquid, yielding non-sticky and substantially free-flowing conglomerated units.

The conglomerate resulting from the above procedures is neither completely a sugar particle coated with cocoa, nor a cocoa particle coated with sugar, but consists of sugar particles and cocoa particles bound together in a somewhat random manner. The cementing liquid, and the sugar deposited therefrom on drying, partially or wholly fill in the space between the particles thus holding the particles together in a cohesive mass, and partially or wholly coating each individual sugar and cocoa particle.

The drying of the resulting mixture can be carried out with conventional drying apparatus and procedures such as are used for drying solids containing small quantities of moisture. Simple air drying of the material at temperature of 40 to 50° C. is satisfactory. During the drying process, the moisture in the cementing liquid evaporates and solid sugar forms between the sugar and cocoa particles and firmly holds these particles together.

The particles of the resulting mix are fairly uniform in size and each particle contains the ingredients attached together in the form of an integrated composite unit which does not separate into the various primary ingredients during mechanical handling, such as screening. The composite particles, both large and small, have all the ingredients distributed within the particles in a substantially uniform manner so that any screen fraction of the mix contains the ingredients in approximately the same proportions.

The dried mix is readily screened to remove any large size conglomerates which may have formed. These large aggregates can be minimized and even eliminated by using efficiently and properly designed spraying and mixing equipment. In general, all particles passing through a Tyler 35 mesh screen are satisfactory to be used in the final product. Particles retained on the 35 mesh screen can be pulverized in a conventional manner and returned to the start of the process for respraying with the cementing liquid in admixture with added ingredients.

The product thus produced is suitable for most uses and can be packaged directly. However, the rate of wetting out and the rate of dispersion of the sugar-cocoa mix can be further increased by a final coating of the aggregated particles and the few separate cocoa particles still remaining unaggregated in the mix with an edible surface active agent such as lecithin. This final coating is advantageously accomplished by spraying the dried mix at ordinary temperatures in a suitable mixing machine or other apparatus with a solution of lecithin.

The solution of lecithin thus used is advantageously a solution of oil soluble lecithin in an edible oil such as corn oil. When the product is thus sprayed only sufficient lecithin-corn oil solution is used to give a very thin surface coating to the particles. Inasmuch as the previous treatment produces conglomerate units, the surface areas of which are much less than the corresponding surface areas of the orginal untreated particles, an economical use of the emulsifying agent results.

An alternative method of treating the sugar-cocoa mix after drying is to spray the mixture with a small amount of a solution of water soluble lecithin in water, or in aqueous sugar solution, advantageously an invert syrup. But the use of the lecithin in oil solution, is particularly advantageous since the fatty materials in the cocoa particles are partially soluble in oil and thus the lecithin can penetrate the surface of the hydrophobic cocoa and thus act more efficiently as a surface active agent than when the lecithin is used in aqueous solution which has little affinity and penetrating power for the cocoa.

A further and alternative procedure is to add the lecithin to the aqueous sugar solution used as a cementing liquid so that the dry mixture of sugar and cocoa is sprayed with such lecithin-containing aqueous sugar solution, thus incorporating the lecithin in the dry sugar-cocoa mix. But, in general, this method is less advantageous than that in which the lecithin is applied as a final spray dissolved in oil. This mix requires no further processing and can be packaged directly.

When properly compounded, as described above, the dry finely divided sugar-cocoa mix, on being stirred with cold milk, wets out and disperses without the formation of agglomerates on the surface of the liquid.

It is one advantage of the present invention that the cocoa used may be the ordinary cocoa of commerce, such as cocoa powder, most of the particles of which pass a 200 mesh screen. The commercial product usually contains 10% to 30% of fat. For a low fat cocoa-sugar mix, which is generally desirable for cold drink mixes, the cocoa used is advantageously low fat cocoa of around 12% to 16% fat content.

The sugar used in making the mix may vary in particle size and may include, e.g. confectioner's 4X grade, with or without added corn starch to prevent caking, about 90% of such sugar passing through a 200 mesh Tyler screen. Other grades of sugar, up to medium fine granulated (approximately 95% on the 35 mesh Tyler screen) can even be used if a sugar-cocoa mix with coarse particle size is desired or is no objectionable.

A crystalline sugar containing invert may advantageously be used for initial admixing with the cocoa before spraying with the cementing liquid. Such sugars can be made, as is well known, by spraying finely powdered or even granulated sugar with invert solution. Or they may be made by pulverizing invert sprayed granulated sugar. These invertized sugars may contain any desired quantity of invert. By the use of these sugars additional invert may be incorporated into the final sugar-cocoa mix over that possible when only a spraying solution containing invert is used.

The particle size of the sugar and cocoa used in making the sugar-cocoa mix affects somewhat the dispersion rate of the resulting product. The sugar-cocoa agglomerates may vary in size depending on whether they are made up from an assemblage of a few particles of cocoa and sugar or a much larger number of particles. Size control of the aggregate can be obtained by regulation of the amount, composition, temperature, and liquid droplet size of the aqueous spray, and of the speed of the mixer used during preparation of the mix.

The treatment of the mixture of sugar and cocoa with the spray solution or wet steam can be carried out either as a batch operation, or as a continuous process. A batch operation can be carried out by spraying a mixture of the sugar and cocoa particles with the finely divided sugar solution or with wet steam with thorough mixing with the regulated amount of the cementing solution or steam spray. In carrying out the process in a continuous manner, the solution can be sprayed onto the mixture of sugar and cocoa and then mixed therewith, or wet steam applied thereto, in apparatus such as screw-type conveyors, or rotating drums designed for supplying the dry mixture and progressively causing it to pass through the apparatus and for spraying the cementing solution onto the mixture or treating with wet steam with continued agitation followed by drying the resulting product and screening it before passing it to the packaging equipment.

It is one advantage of the present process that it does not require special expensive equipment, nor does it require a cooking operation during which the sugar solutions are raised to high temperatures and kept there to reduce the water content. Considerable variation in process variables is allowable without undue effect on the final product and the whole process is easy to control and does not require precise control instruments.

The proportions of sugar and cocoa used in forming the improved dry sugar-cocoa mix may be varied considerably. In the examples hereinafter given, the ratio of sucrose to cocoa varies between 3.8 to 1 and 4.3 to 1. The taste and sweetness of the product can be varied by using other proportions.

When the dried product is finally sprayed with a solution of lecithin and oil, different commercially available edible oils can be used. A solution of lecithin in a bland vegetable oil, such as corn oil, may be advantageously used to give a product with enhanced dispersibility. The lecithin used when dissolved in such an edible oil will be an oil soluble grade of lecithin. When the lecithin is used in water solution a water soluble lecithin will be used. Various proportions of lecithin can be used, e.g., 1 part of lecithin to 2 parts of corn oil, or 1 part of lecithin to about 12 parts of invert sugar solution (50% solids).

The invention will be further illustrated by the following specific examples, but it will be understood that the invention is not limited thereto. The parts are by weight.

*Example 1*

1150 parts of confectioners' 4X sugar without added cornstarch (90% through a 200 mesh Tyler screen) and 270 parts of powdered cocoa (Wilbur-Suchard Richred grade, 14–16% fat content) are sprayed with 200 parts of hot (80° C.) 50° Brix total invert sugar solution using an air pressure spray gun under 20 pounds per square inch gauge air pressure. The cementing liquid is sprayed slowly onto the sugar and cocoa while mixing continuously in a Hobart mixer, Model N–50, using speed No. 1.

After completion of addition of invert solution, mixing is stopped and the moist mixture is air dried at 40° to 50° C. The dry mix is passed through a 35 mesh Tyler screen. The coarse tailings can be reground and reprocessed. The screened, dried product consists of sugar and cocoa particles cemented together.

This cocoa and sugar mix can be used directly, or the dispersibility can be enhanced by addition of lecithin in corn oil. Onto the screened dried mix being agitated in the Hobart mixer on speed No. 1 is sprayed a solution of oil-soluble lecithin (Borden Co. specification B–60S15) (1 part) in Mazola corn oil (2 parts). The total amount of lecithin solution sprayed is 2.25 parts per 100 parts of dried screened mix. No additional drying is required after the spraying of the lecithin-corn oil solution and the product is ready for packaging.

*Example 2*

Three hundred parts of powdered cocoa (Wilbur-Suchard Richred grade, 14–16% fat content) and 7.5 parts of solid lecithin are thoroughly ground together in a mortar to form an intimate mixture of powdered cocoa and the mixture is sifted twice through a flour sifter. 1160 parts confectioners' 4X sugar (without added cornstarch) is introduced into the mixing bowl of a Hobart mixer, Model N–50, and while the sugar is mixed continuously at No. 1 speed, 215 parts of hot (80° C.) 50° Brix total invert sugar solution are sprayed onto the sugar using an air pressure spray gun under 20 pounds per square inch gauge air pressure. Simultaneously with the spraying, the previously prepared cocoa-lecithin mix is sprinkled in slowly. Addition of ingredients requires about 15 minutes, more or less, after which mixing is stopped. The moist mix is air dried at 40° to 50° C. The dry mix is passed through a 35 mesh Tyler screen. The coarse tailings can be reground and reprocessed. The screened, dried product consists of sugar, cocoa, and lecithin cemented together, and is ready for packaging.

*Example 3*

1150 parts of confectioners' 4X sugar without added cornstarch (90% through a 200 mesh Tyler screen) and 270 parts of powdered cocoa (Wilbur-Suchard Richred grade, 14–16% fat content; 98.3% through a 200 mesh Tyler screen) are sprayed with wet steam while mixing continuously in a Hobart mixer, Model N–50, using speed No. 1. During treatment with steam the temperature of the mix rises to 40° to 50° C. due to the heating effect concomitant with introduction of steam. After this treatment the wet mix is air-dried at 40° to 50° C. The dry mix is passed through a 35 mesh Tyler screen. The coarse tailings can be re-ground and reprocessed.

The screened, dried product consists of sugar and cocoa particles cemented together. This cocoa and sugar mix can be used directly, or the dispersibility can be enhanced by addition of lecithin in corn oil. Onto the screened dried mix being agitated in the Hobart mixer on speed No. 1 is sprayed a solution of oil-soluble lecithin (Borden Co. specification B–50S15) (1 part lecithin dissolved in 2 parts corn oil). The total amount of lecithin solution sprayed is 1 part per 100 parts of dried screened mix. No additional drying is required after the spraying of the lecithin-corn oil and the product is ready for packaging.

*Example 4*

1150 parts of pulverized cane sugar containing 5.7% invert sugar and 270 parts of powdered cocoa (Wilbur-Suchard Richred grade, 14–16% fat content, 98.3% through a 200 mesh Tyler screen) are sprayed with 167 parts of hot (80° C.) 50° Brix total invert sugar using an air pressure spray gun under 20 pounds per square inch gauge air pressure. The cementing liquid is sprayed slowly onto the sugar and cocoa while mixing continuously in a Hobart mixer, Model N–50, using speed No. 1.

After completion of addition of invert solution, mixing is stopped and the moist mixture is air dried at 40° C. to 50° C. The dry mix is passed through a 35 mesh Tyler screen. The coarse tailings can be reground and reprocessed. The screened, dried product consists of sugar and cocoa particles cemented together.

This cocoa and sugar mix can be used directly, or the dispersibility can be enhanced by addition of lecithin in corn oil. Onto the screened dried mix being agitated in the Hobart mixer on speed No. 1 is sprayed a solution of oil-soluble lecithin (Borden Co. specification B–60S15) (1 part) in Mazola corn oil (2 parts). The total amount of lecithin solution sprayed is 2 parts per 100 parts of dried screened mix. No additional drying is required after the spraying of the lecithin-corn oil solution and the product is ready for packaging.

The process as illustrated by the examples can be varied in the proportions of sugar and cocoa, in the fineness of the sugar used, in the cementing liquid used and in the incorporation of lecithin in the product.

Thus, solid lecithin may be ground with dry cocoa and an invert sugar solution added simultaneously with the resulting dry cocoa to confectioners' 4X sugar with continuous mixing in a Hobart mixer, using a hot invert sugar solution of 50° Brix (about 90% invert sugar and 10% sucrose) and containing about 50% sugar in solution and using the sucrose, cocoa, etc. in approximate proportions of 78% to 80% sucrose, 18% to 20% cocoa, 2% to 6% invert sugar solids, 0.75% to 1% lecithin and 1.5% to 2% corn oil.

Instead of using a 50° Brix invert sugar solution, a solution of 25° Brix can be used, or even water without sugar with the resulting formation of a sugar solution by dissolving some of the sugar of the mix.

An alternative procedure is to spray the cocoa and sugar with a solution of lecithin in corn oil (0.75 to 1% lecithin and 1.5% to 2% corn oil) during mixing in a Hobart mixer followed by spraying with hot 50° Brix invert sugar solution.

Improved results are obtained as above described, by a final spray of lecithin in an edible oil, such as corn oil, after the mix has been prepared and dried and before packaging.

The improved sugar-cocoa mix of the present invention has the desirable characteristics of a product for use in making chocolate drinks, e.g., by stirring the product in cold milk, as well as for other purposes. The improved mix is free from any objectionable segregation into sugar and cocoa particles, has a desirable and almost instantaneous wetting out action and is almost instantaneously and permanently dispersed in the liquid into which it is introduced. The improved mixes have a desirable bulk density for packaging in definite sized containers and have a long shelf-life without deterioration and without requiring special packaging or storage facilities. The bulk density of the product will vary somewhat with the method of preparation, the type cementing liquid spray solution used and also with the particle size of the sugar used.

The use of any aqueous liquid which of itself will act as a cementing liquid or act to produce a cementing liquid, such as a solution of invert sugar or water, is advantageous and the product resulting therefrom is improved with increased quantities of such spray solution but the amount used should be below that which will produce an unworkable sticky mixture. Whereas the sugar-cocoa mix without the addition of such a cementing agent is unsatisfactory for use with cold milk, the use of such a cementing liquid followed by drying and cementing together of sugar and cocoa particles results in the production of a satisfactory mix.

The bulk density of the final product varies somewhat with the quantity of cementing liquid used. And the final treatment of the dried mix with the solution of lecithin in an edible oil, such as corn oil, generally reduces the bulk density somewhat. In general, the coarser the sugar particles used initially in making the mix, the higher the bulk density of the finished mix. Also, with somewhat coarser sugar particles used initially, a somewhat improved wetting out rate is obtained in the final mix, with a somewhat reduced dispersion rate of the final mix in the liquid.

It will thus be seen that the present invention provides an improved sugar-cocoa mix which is readily miscible with and dispersible in liquids, and particularly in cold liquids such as milk, to produce a chocolate drink as well as for use in hot liquids and for other purposes where chocolate flavored candies, fudge icings, or other products are desired.

It will further be seen that the present invention provides a simple and inexpensive method of producing a cocoa-sugar mix without requiring expensive apparatus for the process. The process is one in which a dry sugar-cocoa mix is cemented together with a liquid cementum, such as an invert sugar solution applied in a finely divided state and distributed throughout the mixture to cement the particles together into aggregates, or with the use of water in a finely divided state to form the cementing liquid, and with the solid sugar formed by drying the sugar solution acting as the cementing medium for the individual particles.

We claim:

1. The method of producing a dry sugar-cocoa mix having aggregates composed of individual particles of sugar and cocoa cemented together which comprises applying to and admixing with a preformed dry mixture containing separate, individual sugar and cocoa particles a limited amount, between about 2% and 9% of the dry mix, of an aqueous liquid in a state of fine subdivision and with agitation of the mix to cause the formation of a freely-flowing mixture of small aggregates composed of sugar and cocoa particles, and drying the resulting mixture causing solid sugar deposited from the liquid to act as a binder between the solid particles.

2. The process according to claim 1 in which the sugar is invert sugar.

3. The method of producing a dry sugar-cocoa mix which comprises spraying finely divided aqueous cementing liquid in limited amount between about 2% and 9% of the dry mix, on a preformed dry mixture of separate, individual sugar and cocoa particles with continued admixture during introduction of the liquid particles to form a freely flowing mixture of small aggregates of sugar and cocoa particles and drying the resulting mixture.

4. The method of producing a dry sugar-cocoa mix which comprises mixing sugar and cocoa particles to form an intimate dry mixture, spraying the mixture with a limited amount between about 2% and 9% of the dry mix, of an aqueous sugar solution with continued agitation of the mixture during introduction of the liquid to cause formation of a freely-flowing mixture of small aggregates of sugar and cocoa particles and drying the resulting mixture causing solid sugar deposited from the liquid to act as a binder between the solid particles.

5. The method of producing a dry sugar-cocoa mix which comprises mixing sugar and cocoa particles to form an intimate dry mixture, treating the mixture with a limited amount between about 2% and 9% of the dry mix, of wet steam with agitation of the mass during introduction of the steam to cause the formation of a freely-flowing mixture of small aggregates composed of sugar and cocoa particles and drying the resulting mixture causing solid sugar deposited from the liquid to act as a binder between the solid particles.

6. The process of producing a dry sugar-cocoa mix which comprises applying to an intimate dry mixture of sugar and cocoa particles a small and regulated amount between about 2% and 9% of the dry mix, of an aqueous liquid in a state of fine subdivision and with agitation of the mix to form a freely flowing mixture of small aggregates of sugar and cocoa particles, drying the resulting product and applying a small amount of a solution of lecithin thereto.

7. The process of producing a dry sugar-cocoa mix which comprises applying to an intimate dry mixture of sugar and cocoa particles a small and regulated amount between about 2% and 9% of the dry mix, of an aqueous liquid in a state of fine subdivision and with agitation of the mix to form a freely flowing mixture of small aggregates of sugar and cocoa particles, drying and resulting product and applying a small amount of an aqueous solution of lecithin thereto.

8. The process according to claim 7 in which the lecithin is applied in the form of a solution of lecithin in an edible oil.

References Cited in the file of this patent

UNITED STATES PATENTS

| | | |
|---|---|---|
| 2,077,819 | Zizinia | Apr. 20, 1937 |
| 2,179,130 | Middleton | Nov. 7, 1939 |
| 2,348,837 | Nyrop | May 16, 1944 |
| 2,430,553 | Bigelow | Nov. 11, 1947 |
| 2,452,770 | Lang | Nov. 2, 1948 |
| 2,760,867 | Kemph et al. | Aug. 28, 1956 |